United States Patent
Suzuki et al.

(10) Patent No.: US 7,739,148 B2
(45) Date of Patent: Jun. 15, 2010

(54) REPORTING METRICS FOR ONLINE MARKETPLACE SALES CHANNELS

(75) Inventors: Masami Alice Suzuki, San Francisco, CA (US); Martha Danly, Point Reyes Station, CA (US); Greg Klenske, San Francisco, CA (US); Katherine Kozuki, Martinez, CA (US); Nicole Van Der Hulst, San Jose, CA (US)

(73) Assignee: Accenture Global Services GmbH, Schaffhausen (CH)

( * ) Notice: Subject to any disclaimer, the term of this patent is extended or adjusted under 35 U.S.C. 154(b) by 1084 days.

(21) Appl. No.: 10/797,906

(22) Filed: Mar. 9, 2004

(65) Prior Publication Data

US 2005/0203804 A1 Sep. 15, 2005

Related U.S. Application Data

(63) Continuation of application No. 10/794,769, filed on Mar. 5, 2004, now abandoned.

(51) Int. Cl.
*G06Q 30/00* (2006.01)
(52) U.S. Cl. .............................. 705/26; 705/27; 705/37
(58) Field of Classification Search .................. 705/26, 705/27, 37
See application file for complete search history.

(56) References Cited

U.S. PATENT DOCUMENTS

| | | | |
|---|---|---|---|
| 5,424,944 A | 6/1995 | Kelly et al. | |
| 5,664,111 A | 9/1997 | Nahan et al. | |
| 5,813,009 A | 9/1998 | Johnson et al. | |
| 5,845,265 A | 12/1998 | Woolston | |
| 5,946,662 A | 8/1999 | Ettl et al. | |
| 5,960,411 A | 9/1999 | Hartman et al. | |
| 6,029,141 A | 2/2000 | Bezos et al. | |
| 6,035,288 A | 3/2000 | Solomon | |
| 6,041,308 A | 3/2000 | Walker et al. | |
| 6,058,417 A | 5/2000 | Hess et al. | |
| 6,064,980 A | 5/2000 | Jacobi et al. | |
| 6,085,169 A | 7/2000 | Walker et al. | |
| 6,085,176 A | 7/2000 | Woolston | |
| 6,202,051 B1 | 3/2001 | Woolston | |
| 6,266,649 B1 | 7/2001 | Linden et al. | |
| 6,317,722 B1 | 11/2001 | Jacobi et al. | |
| 6,343,273 B1 | 1/2002 | Nahan et al. | |

(Continued)

OTHER PUBLICATIONS

Andale "Andale 2003 Einstein Product Showcase", downloaded from the Internet at http://presstours.andale.com/search.html, Jul. 1, 2003, 10 pages.*

(Continued)

*Primary Examiner*—Jason Dunham
(74) *Attorney, Agent, or Firm*—Fish & Richardson P.C.

(57) ABSTRACT

In an online marketplace environment, a connection provider can provide metrics to a seller of items relating to items for sale on one or more online sales channels. In one implementation, a method describes receiving information that describes one or more items for sale by the seller, and facilitating a sale of the items through one or more online sales channels. Metrics are reported to the seller regarding the one or more items for sale on the one or more online sales channels, in which the metrics include top-line highlights, bottom-line highlights, SKU-level information, and an executive summary.

23 Claims, 14 Drawing Sheets

U.S. PATENT DOCUMENTS

Figure 1:
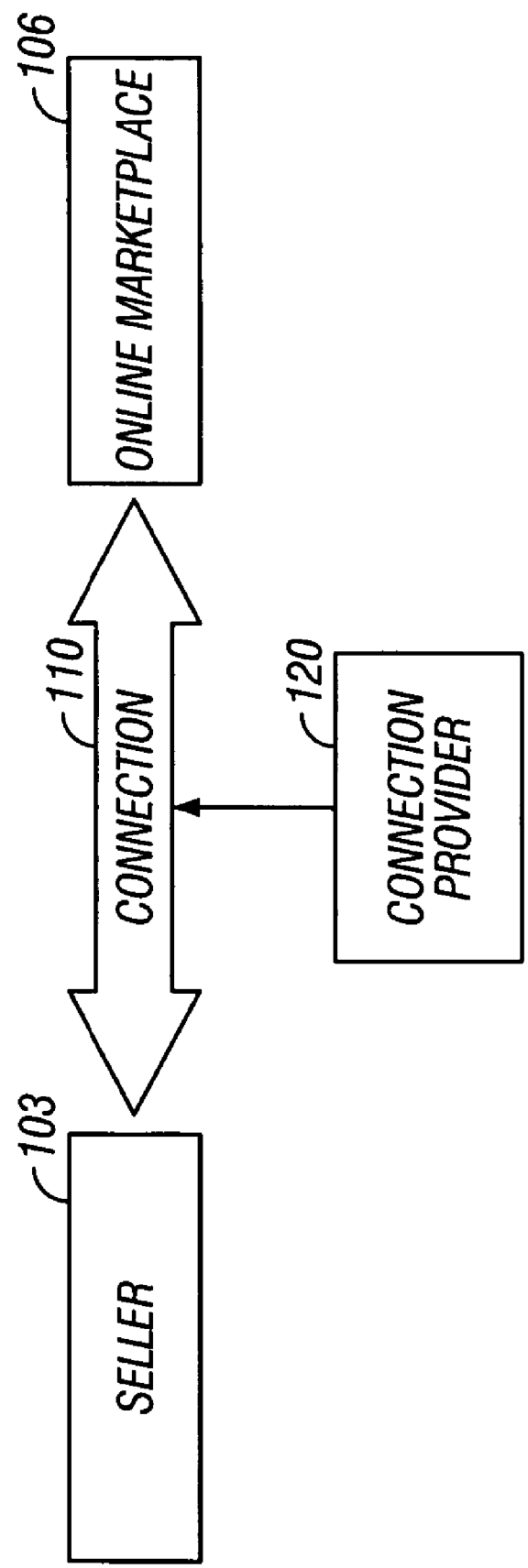

| | | | |
|---|---|---|---|
| 6,356,878 | B1 | 3/2002 | Walker et al. |
| 6,415,320 | B1 | 7/2002 | Hess et al. |
| 6,466,917 | B1 | 10/2002 | Goyal et al. |
| 6,466,918 | B1 | 10/2002 | Spiegel et al. |
| 6,484,153 | B1 | 11/2002 | Walker et al. |
| 6,523,037 | B1 | 2/2003 | Monahan et al. |
| 6,553,346 | B1 | 4/2003 | Walker et al. |
| 6,604,107 | B1 | 8/2003 | Wang |
| 7,249,059 | B2 | 7/2007 | Dean et al. |
| 7,359,871 | B1 | 4/2008 | Paasche et al. |
| 7,440,908 | B2 | 10/2008 | Snapp, et al. |
| 2001/0014868 | A1* | 8/2001 | Herz et al. ............. 705/14 |
| 2001/0033294 | A1 | 10/2001 | Asch et al. |
| 2001/0037245 | A1 | 11/2001 | Ranganath et al. |
| 2001/0047308 | A1* | 11/2001 | Kaminsky et al. ............. 705/26 |
| 2002/0023004 | A1* | 2/2002 | Hollander et al. ............. 705/22 |
| 2002/0032597 | A1* | 3/2002 | Chanos ............. 705/10 |
| 2002/0049664 | A1* | 4/2002 | Hoffman et al. ............. 705/37 |
| 2002/0069134 | A1* | 6/2002 | Solomon ............. 705/26 |
| 2002/0082977 | A1* | 6/2002 | Hammond et al. ............. 705/37 |
| 2002/0099678 | A1 | 7/2002 | Albright et al. |
| 2002/0116302 | A1 | 8/2002 | Wilmes et al. |
| 2002/0156685 | A1 | 10/2002 | Ehrlich et al. |
| 2002/0161676 | A1 | 10/2002 | Vadlamani |
| 2002/0165817 | A1* | 11/2002 | Rackson et al. ............. 705/37 |
| 2002/0169640 | A1 | 11/2002 | Freeland |
| 2002/0169658 | A1* | 11/2002 | Adler ............. 705/10 |
| 2002/0169676 | A1 | 11/2002 | Floyd |
| 2002/0184042 | A1* | 12/2002 | Hommrich et al. ............. 705/1 |
| 2003/0014350 | A1* | 1/2003 | Duell et al. ............. 705/37 |
| 2003/0033205 | A1 | 2/2003 | Nowers et al. |
| 2003/0046220 | A1* | 3/2003 | Kamiya ............. 705/37 |
| 2003/0154134 | A1* | 8/2003 | Wang ............. 705/26 |
| 2004/0015415 | A1 | 1/2004 | Cofino et al. |
| 2005/0033648 | A1* | 2/2005 | Jin et al. ............. 705/26 |
| 2005/0033683 | A1* | 2/2005 | Sacco et al. ............. 705/37 |
| 2005/0055281 | A1 | 3/2005 | Williams |
| 2005/0102215 | A1* | 5/2005 | Ausubel et al. ............. 705/37 |
| 2005/0125330 | A1* | 6/2005 | Dinwoodie ............. 705/37 |
| 2005/0144081 | A1* | 6/2005 | Guler et al. ............. 705/26 |
| 2005/0171858 | A1 | 8/2005 | Cotton et al. |
| 2005/0197909 | A1* | 9/2005 | Klenske ............. 705/26 |
| 2005/0197946 | A1* | 9/2005 | Williams et al. ............. 705/36 |
| 2006/0190352 | A1* | 8/2006 | Zeidman ............. 705/26 |
| 2008/0262865 | A1 | 10/2008 | Cotton et al. |

OTHER PUBLICATIONS

"eBay", http://www.accenture.com/xd/xd.asp?it=enWeb&xd=industries/communications/alliances.

Troy Wolverton, "eBay-Accenture deal aimed at big guns", Cnet News.com, May 7, 2002; http://news.com/2100-1017-901190.html?tag=nl.

Troy Wolverton, "Accenture connects to eBay", Cnet News.com, Oct. 23, 2002; http://news.com/2102-1017-963086.html.

"Improving Inventory Turn and Value Online: What is your eBay Strategy?" A Connection to eBay White Paper, Apr. 2003.

Jabil Circuit, "Jabil Global Services", http://www.jabil.com/1048.asp, May 28, 2004.

Jabil Circuit, "Returns"; http://www.jabil.com/1037.asp, May 28, 2004.

Andale, "Smart Tools and Services to Help you Sell on eBay", http://www.andale.com/corp/products/products.jsp May 28, 2004.

Andale, "Sales Analyzer", http://www.andale.com/rep/rep_quickstart.jsp?foo=4379&resetStoresNav=y May 28, 2004.

"Operating Agreement", Amazon.com, http://affiliate-program.amazon.com/gp/associates/agreement/ref=amb_link_517882_10/103-5314425-4118200?pf_rd_m=ATVP.

Participation Agreement, http://amazon.com/gp/help/customer/display.html/002-5582521-1516869?ie=UTF8&nodeId=1161302&qid=1184600773&sr=2-1, (1 of 7), Jul. 16, 2007, 12:50:26 PM.

Priceline.com Incorporated Web Site Terms & Conditions, Agreement between User and priceline.com Incorporated, http://www.priceline.com/customerservice/faq/ShowHelp.asp?faq=ext(AIRPOP_Terms), (1 of 20), Jul. 16, 2007, 12:49:36 PM.

USPTO Final Office Action issued in U.S. Appl. No. 10/099,676, mailed Dec. 3, 2009, 13 pages.

Accenture: "eBay, Accenture to link consumers to manufacturer' and retailers' inventories," Electronic Commerce New, May 13, 2002, v7i10pg1, Proquest #119400039, 3pgs.

Amazon: "Amazon.com Auctions Helps Online Sellers Become Effective Mailceters," PR Newswire, Aug. 18, 1999, Proquest #44014963, 4pgs.

Andale "Andale 2003 Einstein Product Showcase", downloaded from the internet at http://presstours.andale.com/search.html on Jul. 1, 2003, 10 pages.

Anderson, USPTO Office Action in U.S. Appl. No. 10/794,769 dated Nov. 30, 2007, 24 Pages, to be published by USPTO with the file history of this application.

Anderson, USPTO Office Action in U.S. Appl. No. 10/794,769 dated Jun. 25, 2008, 26 Pages, to be published by USPTO with the file history of this application.

Buterin, "Top Dog Sales Strategy", Purple Squirrel, Oct. 2001, downloaded from the internet at http://www.purplesquirrel.com/articles/2001/oct/buterin.shtml on Dec. 31, 2003, 3 pages.

Connection to eBay; "eBay and Accenture unveil new service . . . ," Business Wire, May 7, 2002; Proquest #1181166491, 3 pgs.

Haider, USPTO Office Action in U.S. Appl. No. 10/794,583 dated Jul. 3, 2008, 6 Pages, to be published by USPTO with the file history of this application.

Haider, USPTO Office Action in U.S. Appl. No. 10/794,583 dated Dec. 10, 2008, 26 Pages, to be published by USPTO with the file history of this application.

Haider, USPTO Office Action in U.S. Appl. No. 10/794,583 dated Jun. 22, 2009, 8 Pages, to be published by USPTO with the file history of this application.

Haq, USPTO Office Action in U.S. Appl. No. 10/808,730 dated Jan. 9, 2007, 7 Pages, to be published by USPTO with the file history of this application.

Haq, USPTO Office Action in U.S. Appl. No. 10/808,730 dated May 1, 2007, 8 Pages, to be published by USPTO with the file history of this application.

Haq, USPTO Office Action in U.S. Appl. No. 10/808,730 dated Oct. 16, 2007, 19 Pages, to be published by USPTO with the file history of this application.

Haq, USPTO Office Action in U.S. Appl. No. 10/808,730 dated Jul. 17, 2008, 10 Pages, to be published by USPTO with the file history of this application.

Keefe, Collin; "Where haves meet wants," Dealerscope, Jan. 2002; v44i1 ,p. 50; Proquest #988243388, 9 pgs.

Pond, USPTO Office Action in U.S. Appl. No. 10/658,671 dated May 2, 2008, 16 Pages, to be published by USPTO with the file history of this application.

Pond, USPTO Office Action in U.S. Appl. No. 10/658,671 dated Dec. 12, 2008, 14 Pages, to be published by USPTO with the file history of this application.

Pond, USPTO Office Action in U.S. Appl. No. 10/658,671 dated May 13, 2009, 10 Pages, to be published by USPTO with the file history of this application.

\* cited by examiner

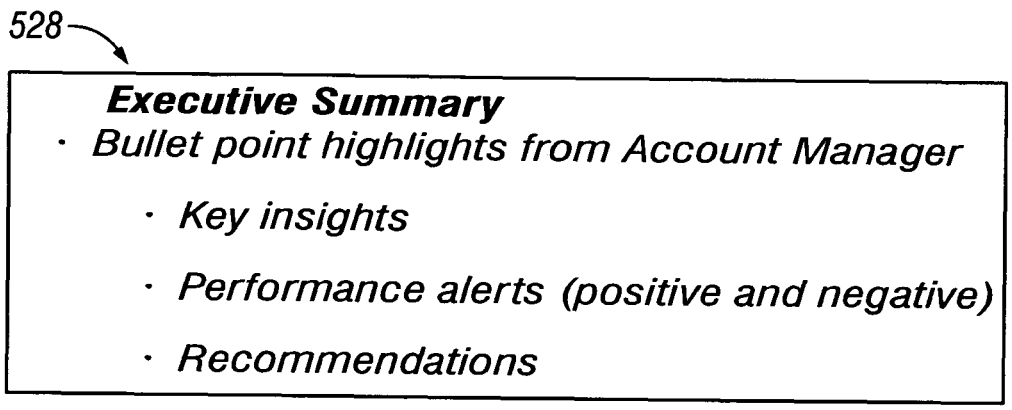
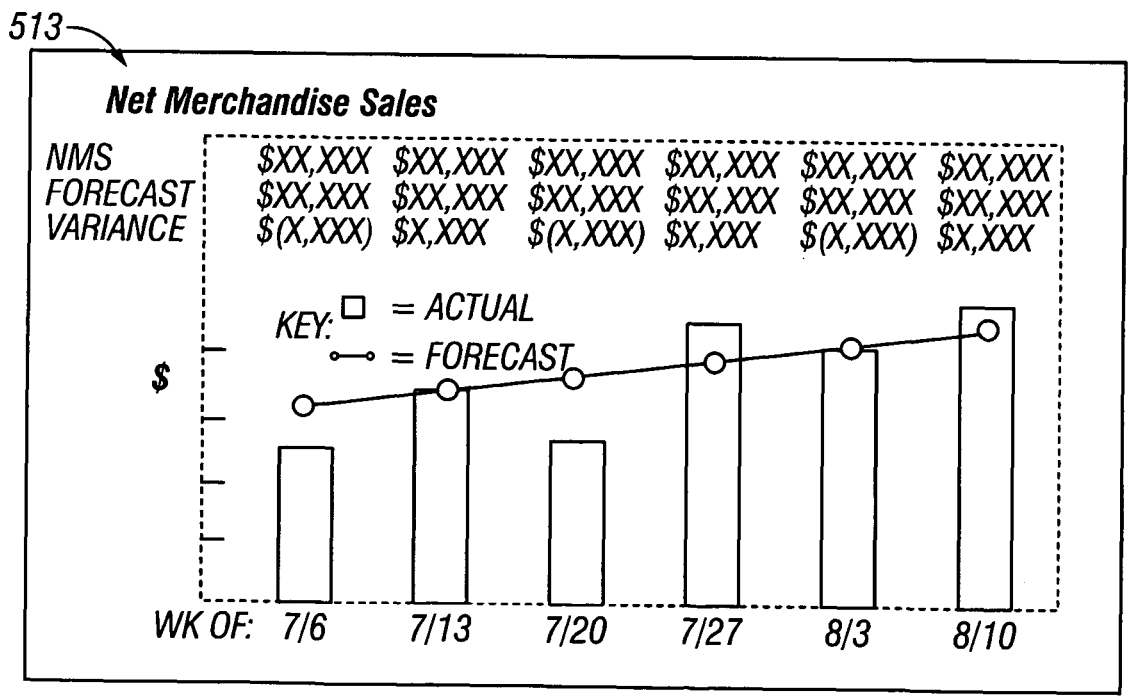
FIG. 5A

533

| Metric | Top Line Highlights | | |
|---|---|---|---|
| | Current Wk | Past Wk | Change |
| NMS | $40,000 | $39,000 | $1,000 |
| NMS TO DATE | $850,000 | $810,000 | $4,000 |
| #LISTED SKUs | 135 | 145 | (10) |
| AUCTION | | | |
|   NMS | $30,000 | $30,000 | 0 |
|   #LISTINGS | 275 | 275 | 0 |
|   #UNITS SOLD | 300 | 225 | 75 |
|   CR% | 80% | 75% | 5% |
| FIXED PRICE | | | |
|   NMS | $9,000 | $8,000 | $1,000 |
|   #LISTINGS | 100 | 120 | 5 |
|   #UNITS SOLD | 175 | 200 | (25) |
|   UNITS SOLD/LISTING | 1.8 | 1.7 | 0.1 |
| STORE SALES | | | |
|   NMS | $1000 | $1000 | 0 |
|   #LISTINGS | 25 | 25 | 0 |
|   #UNITS SOLD | 25 | 30 | (5) |
|   UNITS SOLD/LISTING | 1.0 | 1.2 | (0.2) |
| ASP$ | $80.00 | $86.67 | ($6.67) |
| ASP% OF TARGET | 95% | 93% | 2% |
| ASP % OF ANCHOR (XXX) | 125% | 120% | 5% |

FIG. 5A
*(Continued)*

543 ↘

| Bottom Line Highlights | | | |
|---|---|---|---|
| Metric | Current Wk | | %NMS |
| GMS | $43,000 | | |
| NMS | $40,000 | | |
| EBAY FEES | $X,XXX | (est) | X.X% |
| PAYPAL FEES | $X,XXX | | X.X% |
| C2E FEES | $X,XXX | | X.X% |
| WAREHOUSE | $X,XXX | | X.X% |
| TOTAL FEES | $X,XXX | | XX.X% |
| NET PROCEEDS | $XX,XXX | | XX.X% |

Product Highlights: Slow Movers

| SLOW MOVERS: | GMS $ | UNITS SOLD | TIMES LISTED | UNITS IN STOCK | GMS POTENTIAL | START$/ TARGET$ |
|---|---|---|---|---|---|---|
| 1. PRODUCT TITLE SKU | — | — | — | — | — | — |
| 2. PRODUCT TITLE SKU | — | — | — | — | — | — |
| 3. PRODUCT TITLE SKU | — | — | — | — | — | — |

546 ↗

*FIG. 5A*
*(Continued)*

548

Product Highlights: Best Sellers

| TOP $ SELLERS: | GMS $ | UNITS SOLD | UNITS IN STOCK | ASP $ | GMS POTENTIAL | ASP$/ TARGET |
|---|---|---|---|---|---|---|
| 1. PRODUCT TITLE SKU | — | — | — | — | — | — |
| 2. PRODUCT TITLE SKU | — | — | — | — | — | — |
| 3. PRODUCT TITLE SKU | — | — | — | — | — | — |

| TOP UNIT SELLERS: | GMS $ | UNITS SOLD | UNITS IN STOCK | ASP $ | GMS POTENTIAL | ASP$/ TARGET |
|---|---|---|---|---|---|---|
| 1. PRODUCT TITLE SKU | — | — | — | — | — | — |
| 2. PRODUCT TITLE SKU | — | — | — | — | — | — |
| 3. PRODUCT TITLE SKU | — | — | — | — | — | — |

| TOP MARGIN PRODUCERS: | GMS $ | UNITS SOLD | UNITS IN STOCK | ASP $ | GMS POTENTIAL | ASP$/ TARGET |
|---|---|---|---|---|---|---|
| 1. PRODUCT TITLE SKU | — | — | — | — | — | — |
| 2. PRODUCT TITLE SKU | — | — | — | — | — | — |
| 3. PRODUCT TITLE SKU | — | — | — | — | — | — |

*FIG. 5A*
*(Continued)*

510 ⟶

KEY STATISTICS

- YEAR-TO-DATE GMS[1]:      $800,000
- LAST WEEK NMS[2]:      $50,000
- CURRENT WEEK NMS[2]:      $28,000 (TUES)
- AVG. RECOVERY[3]:      118%
- AVERAGE SELLING PRICE:      $89.57
- #UNITS SOLD[2]:      500
- #SKUs LISTED:      200
- HOT ITEMS ⟵ 535
    - SKU ABC - HOME THEATER SYSTEM
    - SKU DEF - MICROWAVE
    - SKU GHI - HP LAPTOP
    - SKU JKL - HI-FI VCR
    - SKU MNO - NOISE CANCELING HEADPHONES

545 ⟶

- OTHER NOTEWORTHY NEWS
    - ~825 ORDERS HAD SHIPPING DELAYS FROM 9/23-10/6 DUE TO CHANGES MADE TO SYSTEMS
    - MADE ADJUSTMENTS TO AUCTION STRATEGY ON 10/1 TO INCREASE RECOVERY    ⟵ 547
    - 97.9% POSITIVE FEEDBACK ACHIEVED    ⟵ 549
    - RECOMMEND ADDING INVENTORY BEHIND SKUS ___ AND ___ TO SUPPORT UPCOMING EBAY SEASONAL PROMOTION

527 ⟶

[1] GROSS MERCHANDISE SALES (INCLUDES ALL CHECKED OUT SALES AND UNCHECKED OUT SALES FOR PAST 30 DAYS)

[2] NET MERCHANDISE SALES (CHECKED OUT GROSS MERCHANDISE SALES)

[3] AVERAGE RECOVERY AGAINST LOWEST CHANNEL

Figure 5B:
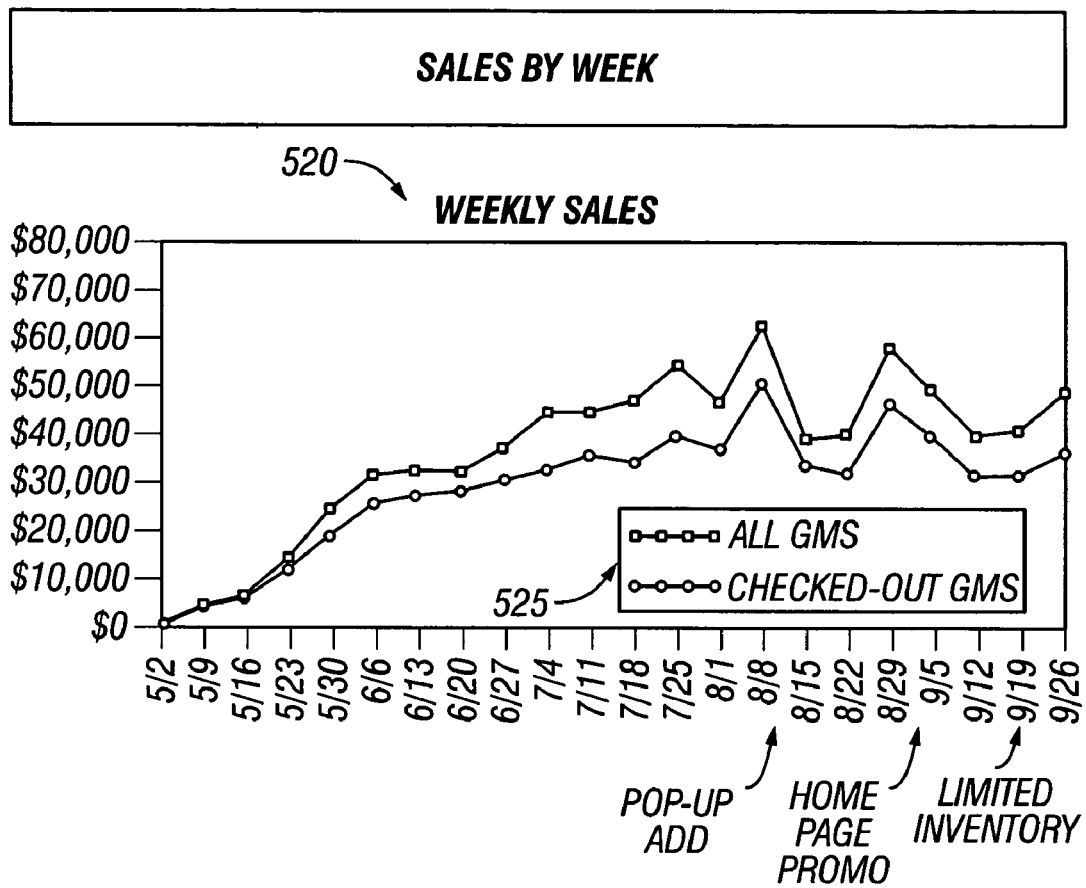

FIG. 5B
*(Continued)*

*FIG. 6A*

| FIELD CATEGORIES 660 | REQUIREMENTS 680 | SERVICE OFFERING 682 | DISPLAY 684 | DESCRIPTIONS 686 | EXAMPLES 688 |
|---|---|---|---|---|---|
| ATL CHANGE 662 | NUMERIC | ALL SO | REQUIRED | QUANTITY ON HAND AVAILABLE TO LIST ON THE SITE. FOR SO4S, THIS NUMBER WILL COME FROM FULFILLMENT | 10 |
| DEFAULT QUANTITY TO LIST 664 | NUMERIC | ALL SO | OPTIONAL | USED IF A SPECIFIC NUMBER OF PRODUCTS WILL BE LISTED FOR EVERY AUCTION | 1 |
| MSRP 667 | NUMERIC | ALL SO | REQUIRED | MANUFACTURER SUGGESTED RETAIL PRICE FOR THE PRODUCT. EITHER MSRP, COGS, OR BOTH MSRP AND COGS IS REQUIRED FOR EACH SKU. DO NOT USE $ | 59.99 |
| COGS 668 | NUMERIC | ALL SO | REQUIRED | COST OF GOODS SOLD FOR THE PRODUCT. EITHER MSRP, COGS, OR BOTH MSRP AND COGS IS REQUIRED FOR EACH SKU. DO NOT USE $ | 19.45 |
| TARGET PRICE 670 | NUMERIC | ALL SO | OPTIONAL | THIS PRICE IS THE TARGET FOR A SPECIFIC ITEM. DO NOT USE $ | 59.99 |
| DEFAULT STARTING PRICE 672 | NUMERIC | ALL SO | OPTIONAL | THIS PRICE FIELD IS AN OPTION TO START EACH AUCTION FOR THIS PRODUCT - SHOULD BE CONSIDERED AFTER THE PRODUCT STRATEGY HAS BEEN DEFINED. DO NOT USE $ | 39.99 |
| DEFAULT AUCTION BIN PRICE 674 | NUMERIC | ALL SO | OPTIONAL | THIS PRICE FIELD IS AN OPTIONAL BIN (IF OPTION IS SELECTED) DEFAULT - SHOULD BE CONSIDERED AFTER THE PRODUCT STRATEGY HAS BEEN DEFINED. DO NOT USE $ | 59.99 |
| DEFAULT AUCTION RESERVE PRICE 676 | NUMERIC | ALL SO | OPTIONAL | THIS PRICE FIELD IS AN OPTIONAL RESERVE PRICE (IF OPTION IS SELECTED) DEFAULT - SHOULD BE CONSIDERED AFTER THE PRODUCT STRATEGY HAS BEEN DEFINED. DO NOT USE $ | 42.99 |
| DEFAULT STORE BIN PRICE 678 | NUMERIC | ALL SO | OPTIONAL | THIS FIELD WILL PROVIDE THE START/END PRICE FOR A STORE (IF STORE LISTING ONLY) DO NOT USE $ | 59.99 |

FIG. 6B

REPORTING METRICS FOR ONLINE MARKETPLACE SALES CHANNELS

BACKGROUND

The following description relates to providing access to online marketplace services, for example, to allow sellers of property or merchandise to sell goods or items through an online auction or a fixed-priced sales channel. An online marketplace, such as provided at www.ebay.com, can facilitate the sell of items and host auctions via one or more web sites in which people and organizations from all around the world can buy and sell goods and services. Among other goods and services, collectibles, books, jewelry, appliances, computers, tickets, sporting goods, furniture, equipment, vehicles, and vacation packages are listed on the marketplace web sites, and bought and sold online daily. The online marketplace may facilitate the selling of items at fixed prices (e.g., static prices) and/or at dynamic prices (e.g., auctions).

In the online selling process, a seller may desire information on how well its goods are selling with respect to expectations, forecasts, and/or targets. The seller may want to know high-level business metrics for what was sold, when it was sold, and the selling price (e.g., average selling price of $52.00). For example, the seller may want to know top-line sales information, such as the gross revenue of their sales. Other top-line sales information may include an average sales price (ASP), the number of units sold, the gross merchandise sales (GMS), and the net merchandise sales (NMS) (e.g., actual sales revenue collected from buyers). The seller may also want to know bottom-line (e.g., final results) sales information, such as net income or profits (e.g., gross revenue minus costs or net sales minus fees). Sellers may need some guidance or recommendations on selling, merchandising, pricing, or promoting their goods, as well as some insight on their volume and margin expectations.

Participants in online marketplaces may include individuals, small companies, large corporations, or other types of organizations. In general, the term "organization" may refer to a company, enterprise, business, government, educational institution, or the like. The term "organization" can also refer to a group of persons, such as an association or society.

Some participants in online marketplaces may have business-to-business (B2B) relationships with other participants that may tend to focus on a vertical market, such as healthcare or automotive. Participants in a B2B marketplace can liquidate unwanted capital assets, dispose of excess inventory, and buy or sell equipment, goods, and services. Other participants in online marketplaces may have business-to-consumer (B2C) relationships. A business may sell goods and services to the consumer market in a B2C online marketplace. Some other participants may have consumer-to-consumer (C2C) relationships, in which individuals can buy and sell goods and services with other individuals.

In one example of an online marketplace, eBay Inc. of San Jose, Calif. provides online services in which buyers and sellers can browse (e.g., navigate), list goods (e.g., post for sale), and buy and sell various goods and services in a web-based marketplace. eBay provides online auction and listing services, in which eBay typically does not directly handle or own the goods. Instead, eBay can facilitate the listing of the goods and services on its website, like want-ads in a newspaper, and facilitate transactions of trading activities between buyers and sellers. Among other operations, eBay can provide listing features beyond what can be offered in a newspaper, such as a dynamic pricing structure, a presentation of items with digital photographs, a formatting of listing information, and customer feedback.

Online marketplaces represent a sales channel—that is, an avenue for selling goods or services—that has become popular only recently. More traditional sales channels include "brick-and-mortar" storefronts, for example, a department store in which a good (e.g., a shirt) can be sold to buyers of the good. Other sales channels include catalog sales, door-to-door sales, and telemarketing sales. A seller may use multiple sales channels to sell its goods or services—e.g., retail stores and an online sale channel such as a web site with similar product offerings. In the case of an online sales channel, a seller may either set-up and maintain its own dedicated web-site that sells only its own merchandise or the seller may use an online marketplace web-site (e.g. eBay, Amazom.com or Buy.com) that sells merchandise owned by several different sellers. As used herein, "online sales channel" encompasses both dedicated, single-seller online sales channels as well as multiple-seller online sales channels.

SUMMARY

In one implementation, the present disclosure describes a method that involves receiving information describing one or more items for sale by a seller, and facilitating a sale of the items through one or more online sales channels. The method also involves reporting metrics to the seller regarding the one or more items for sale on the one or more online sales channels, in which the metrics include top-line highlights, bottom-line highlights, SKU-level information, and an executive summary. The "item" may refer to a good and/or a service.

The reporting can provide the seller with a central source for measuring and assessing information. The metrics may include recommendations to improve any of the top-line highlights and bottom-line highlights. The reporting may also provide feedback on a condition of sales in comparison to one or more sales targets. A performance of actual sales can be tracked relative to the one or more sales targets, and one or more sales targets can be determined by the seller. The metric reporting may also facilitate sales adjustments that are responsive to a dynamic sales environment.

The method may include providing a software infrastructure that can enable the seller to provide information describing one or more items to be sold on the online sales channels. The method also may involve keeping track of information related to one or more items for sale, in which the information includes financial information (e.g., fees and costs) and a quantity of goods sold. The reporting of metrics may involve providing the seller with insights and strategic recommendations on sales activities, and showing interrelationships of sales activities and cause-and-effect patterns. Access to one or more reporting metrics may be provided at the seller's convenience, and one or more reporting metrics can be customized based on the seller's preferences.

The method may involve receiving one or more of the following: business-specific information; data within objects, spreadsheets, and text files; and business-related applications and logic. A product data file (PDF) may be received and validated, in which the PDF includes data entries for the one or more items for sale.

In another aspect, a system includes one or more reports providing information from a connection provider to a seller of one or more items for sale on one or more sales channels. The one or more reports are generated by the connection provider. The system has one or more targets relating to goals and forecasts for the items for sale, and the targets are determined by the seller. The system also has a reporting tool to present the one or more reports to the seller, in which the reporting tool includes a dashboard with an executive summary with qualitative subjective information that provides value to quantitative information in the reports and/or the dashboard.

The reports may include one or more benchmarks of the seller's targets, and the executive summary may include insights, recommendations, performance alerts and analysis for the seller. The dashboard can include top line highlights and bottom line highlights. The top line highlights can present a comparison of sales performance and sales forecasts, and the bottom line highlights can present bottom line performance and reveal insights to costs.

The reporting tool may allow the seller to assess the performance of one or more sales, inventory, pricing, and marketing parameters relative to one or more specified targets, in which the reporting tool includes self-servicing functionality to allow the seller to access information at the seller's convenience. One or more reports may include a presentation of issues, alerts, news, customer feedback, and/or recommendations to provide value to the seller. The information presented in the reports may be customized by the seller.

The system may include an Online Analytical Processing (OLAP) capability to facilitate organized views of auction data. The OLAP capability can include functionality that enables a user to view a web-based presentation of the auction data, in which the web-based presentation includes a format that is organized into logical groups of information. The auction information presented may include one or more of gross merchandise sales (GMS), net merchandise sales (NMS), and an auction conversion rate for the one or more listings.

In another implementation, an article is described that includes a machine-readable medium storing instructions operable to cause a machine to perform the operations of receiving information describing one or more items for sale by a seller, and facilitating a sale of the items through one or more online sales channels. The operations also may include reporting metrics to the seller regarding the one or more items for sale on the one or more online sales channels, in which the metrics include top-line highlights, bottom-line highlights, SKU-level information, and an executive summary.

The systems and techniques described here may provide one or more of the following advantages. For example, a connection provider (e.g., an intermediary entity that can provide services to sell items on online marketplaces) may provide a seller with insight and recommendations on merchandise to enhance the strategic position of the seller. The seller can adapt sales strategies and positioning in a dynamic sales environment. The connection provider can also provide top-line sales information to help the seller to realize how well sales are tracking against forecasts. The bottom-line information provided by the connection provider to sellers can help sellers to reduce their costs and expenses while maximizing sales potential. One or more reports to the seller can be automatically generated to reduce the amount of costs associated with employing human labor. The reports can show interrelationships in sales activities, as well as and cause-and-effect patterns in the seller's selling strategy over time (e.g., the seller can lower the target price to see if they can sell more units). The seller can also have a greater level of control over how their goods are sold than what is typically provided in an online marketplace environment. The seller may provide the connection provider with one or more standard files of information to provide enhanced value of selling items over one or more online sales channels (e.g., enhanced product listings and descriptions). The seller may be able to obtain information and guidance regarding selling their items on the online sales channels where such information and guidance may not normally be easily obtained, if obtained at all, in an online auction environment.

The details of one or more implementations are set forth in the accompanying drawings and the description below. Other features and advantages will be apparent from the description and drawings, and from the claims.

DRAWING DESCRIPTIONS

Figure 2:
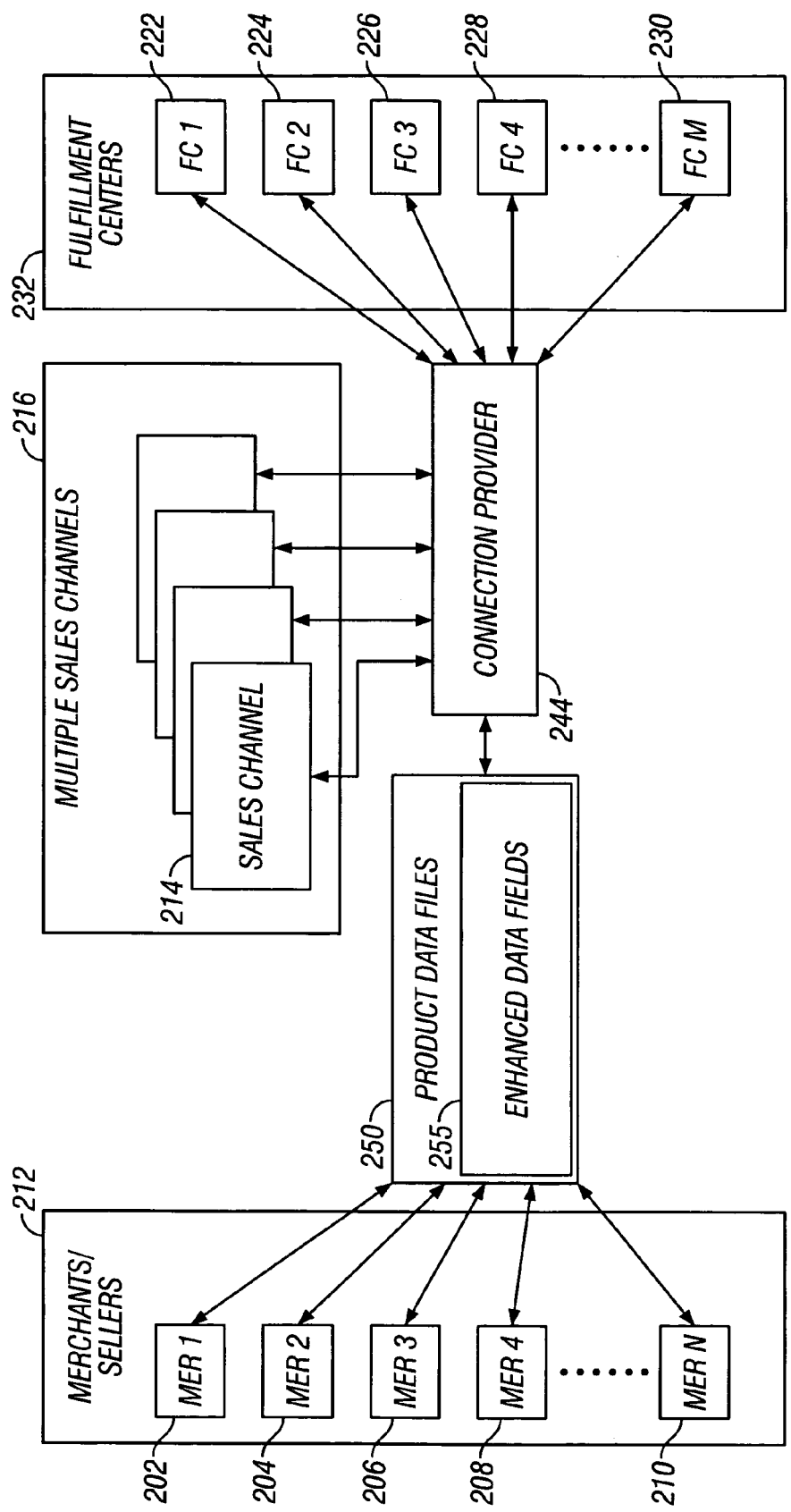
Figure 3:
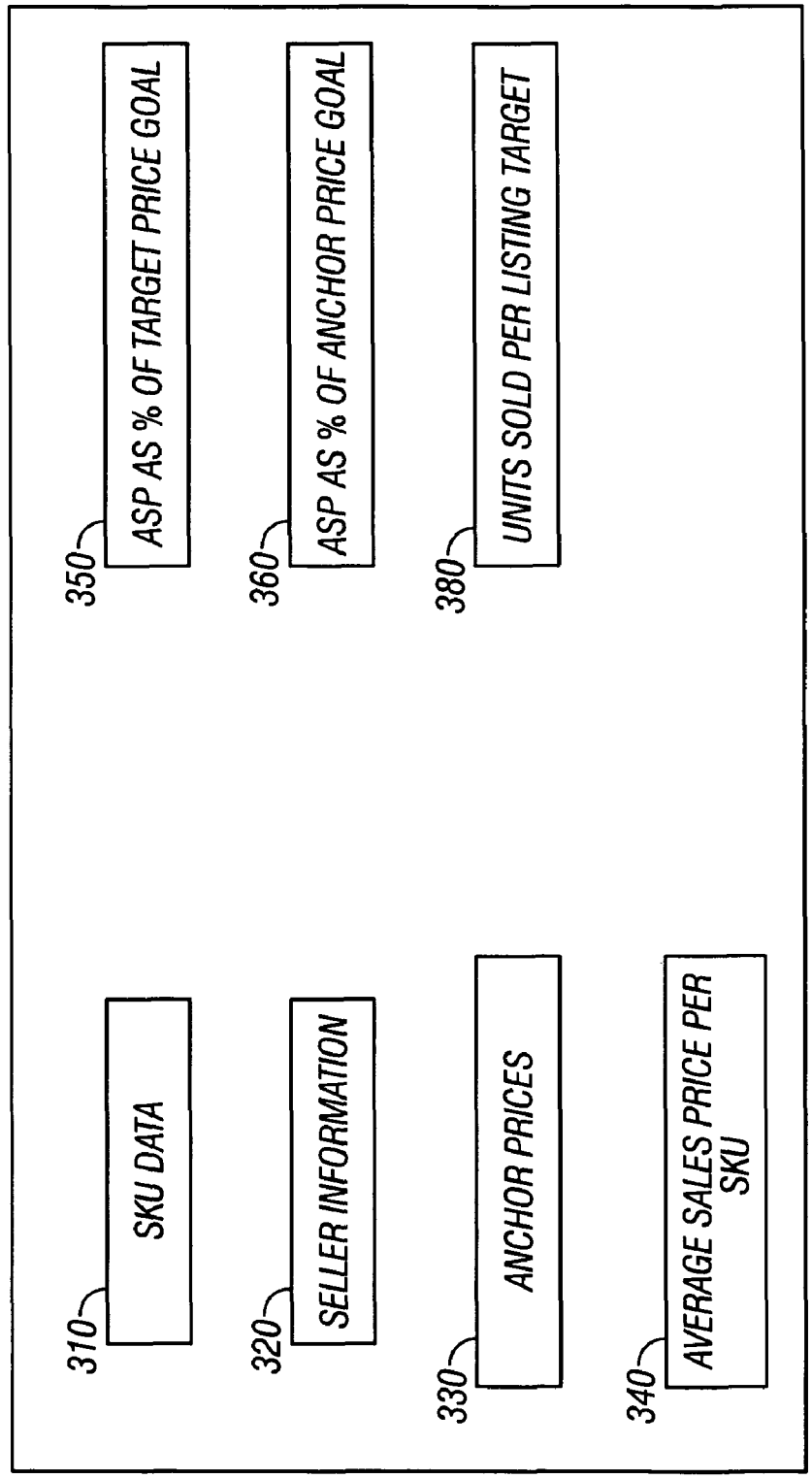
Figure 4:
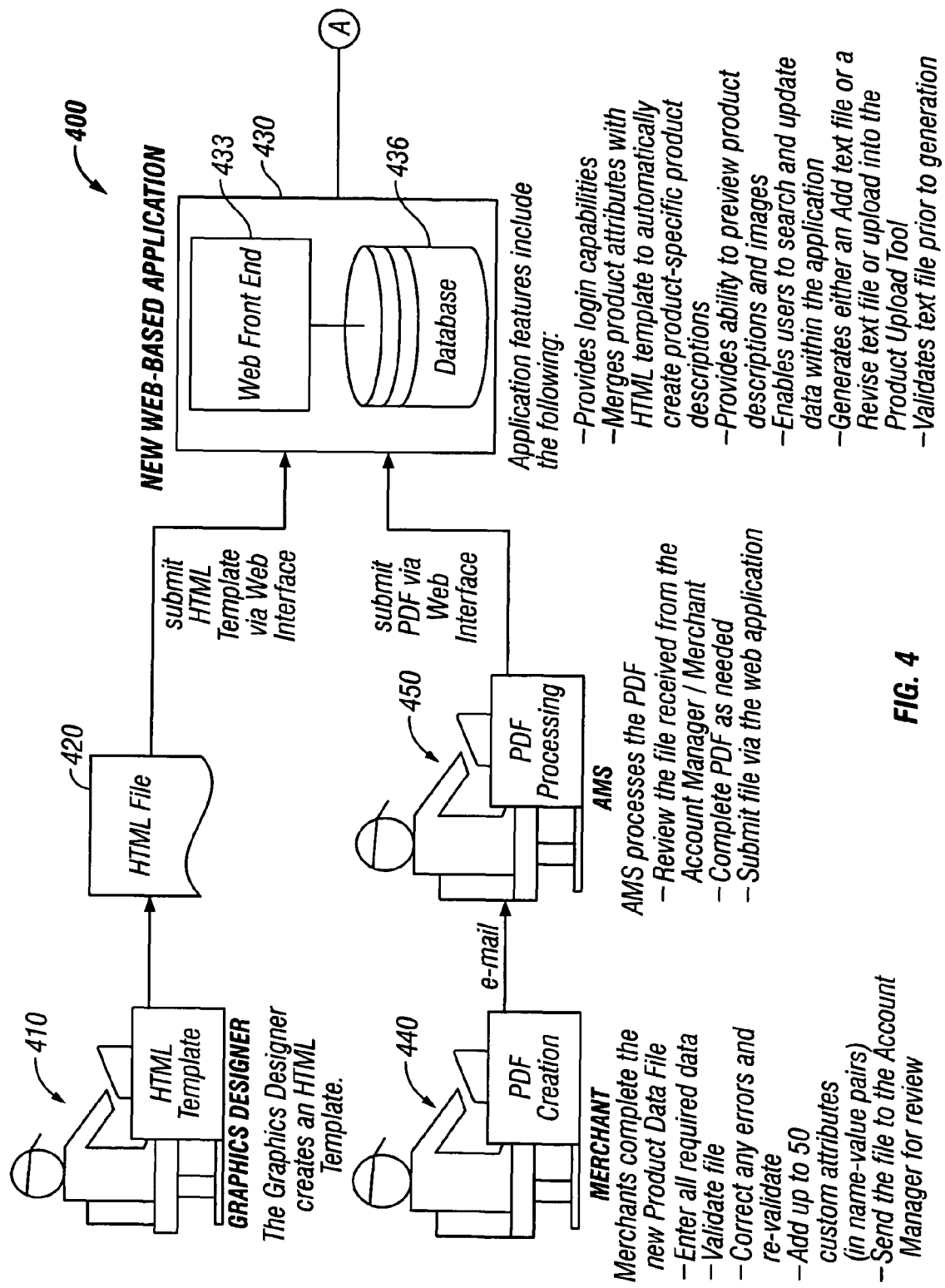
Figure 4:
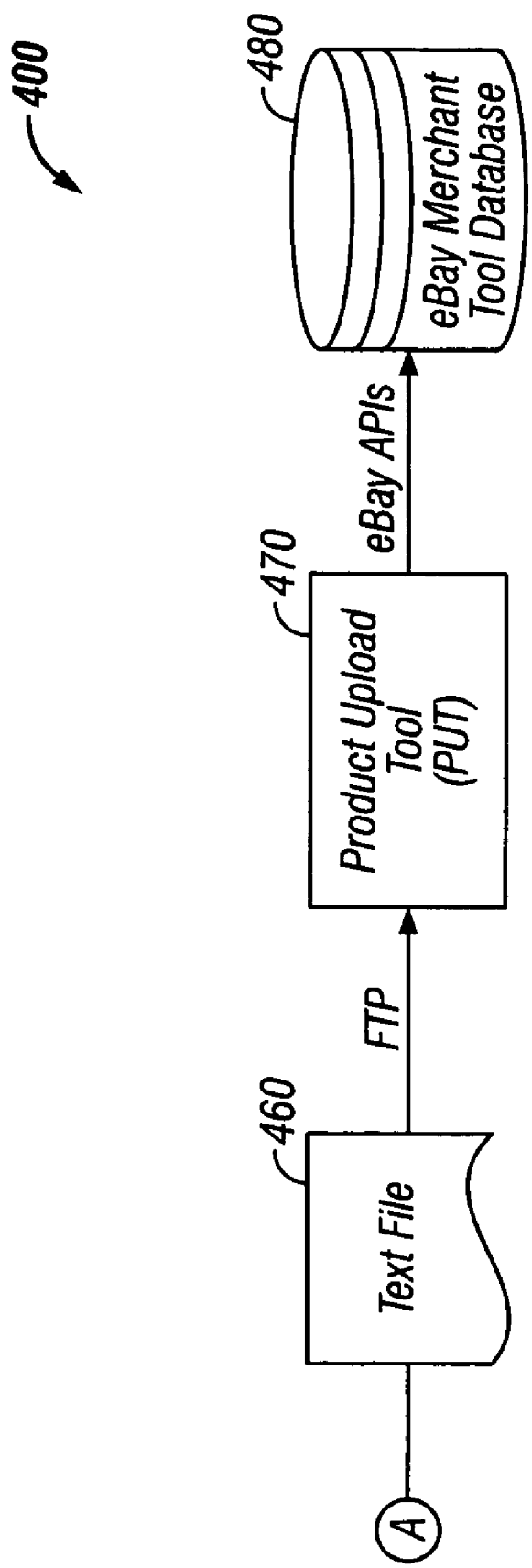
Figure 6A:
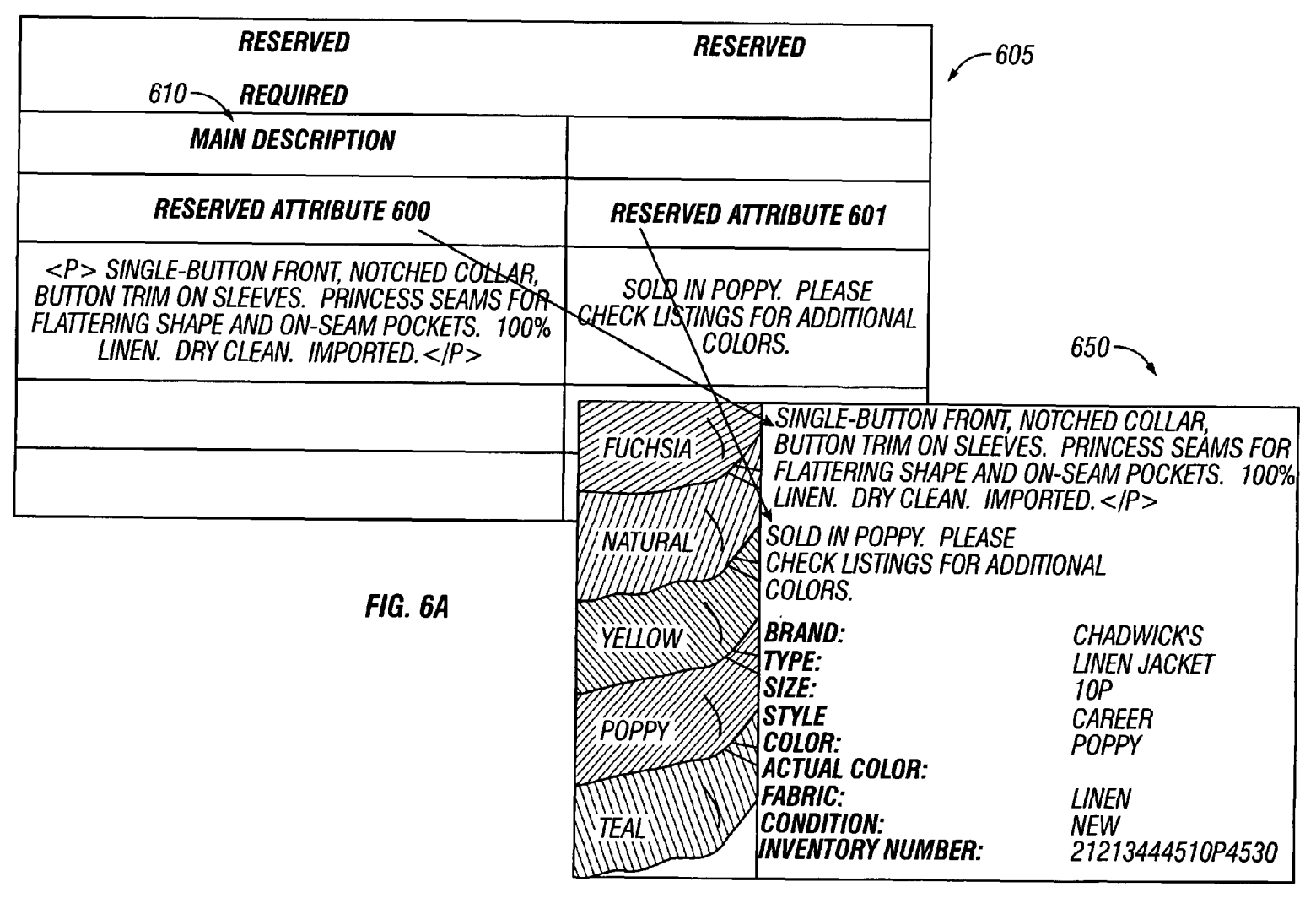
Figure 7:
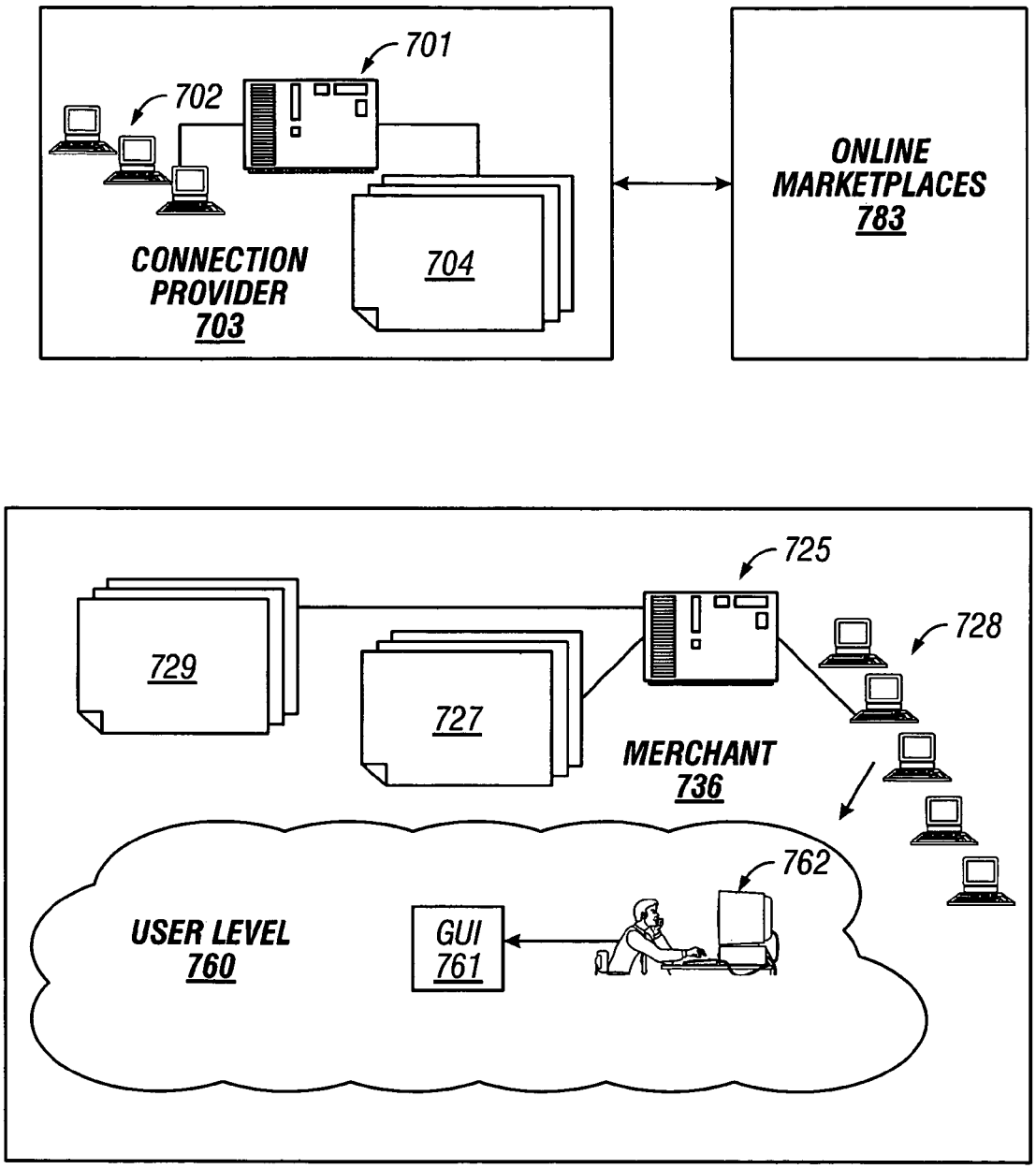

FIG. 1 is a block diagram showing a connection between a seller and an online sales channel.
FIG. 2 is a block diagram of a connection architecture.
FIG. 3 is a block diagram of a product data file (PDF).
FIG. 4 is a flow diagram for generating a product data file.
FIGS. 5A and 5B are representations of a merchant dashboard.
FIGS. 6A and 6B are diagrams illustrating contents of a product data file.
FIG. 7 is a block diagram of a computer system architecture.
Like reference symbols in the various drawings may indicate like elements.

DETAILED DESCRIPTION

FIG. 1 is a block diagram showing a connection 110 between a seller 103 and an online marketplace 106. The seller 103 may offer items to sell through the online marketplace sales channel 106. As used herein, "items" can mean goods—whether new, used or refurbished—services, or a combination of goods and services. In one implementation, the seller 103 can employ a connection provider 120 who will facilitate the connection 110 to one or more online marketplaces 106. The online marketplaces 106 may provide a primary or alternative sales channel for the seller 103. The one or more online marketplaces 106 may or may not be owned and/or controlled by the connection provider 120. Typically, the connection provider 120 is a separate legal entity from the online marketplaces 106 to which it provides a connection 110.

Examples of connection providers include Accenture Ltd., ChannelAdvisor Corp. and AuctionWorks, Inc. Examples of sellers include manufacturers, distributors, retailers, corporations, and government entities. In addition, enterprises not ordinarily in the business of selling goods, a services provider, for example, may nevertheless find it beneficial to establish an online sales channel to sell items such as used computer equipment, office furniture, excess supplies and the like. Examples of online sales channels include eBay, Amazon, and Buy.com.

A seller 103 need not necessarily employ a connection provider 120 to develop an alternative sales channel on the online marketplace 106, but rather may develop the alternative sales channel using its own personnel and resources, for example, by accessing the online sales channel directly and listing its items for sale. Typically, directly listing items for sale on an online sales channel requires an investment of the seller's resources including personnel time, technology, and capital. For example, an automobile parts supplier may hire its own staff and purchase extra computers and software to list, for example, new or refurbished automobile parts on eBay.

Alternatively, the seller 103 may employ a third-party connection provider 120 to develop an alternative sales channel on the online marketplace 106. In that case, the seller 103 need not, for example, hire extra staff, buy additional equipment, or develop the in-house expertise for the alternative sales channel. Rather, the seller 103 can hire the connection provider 120 to outsource the development and maintenance of the alternative sales channel. In hiring the connection provider 120, the seller 103 may form a relationship or an account with the connection provider 120. The connection provider may provide a multitude of services to the seller, such as customer service, sales strategy, auction strategy, logistics management, and checkout procedures.

When sellers provide information on the goods they are selling, they may typically be limited to how much information they can provide. The limited amount of information may reduce the amount of control the seller has over the sale of their goods. For example, the sellers may not be able to customize the sale of their goods. In another case, the seller may not receive enough information or feedback about the sale of their goods to maintain or enhance sales performance. The seller may also not have sufficient knowledge about the nuances (e.g., audience, promotion, options, selling strategies) of the market place to sell effectively. If the seller could track the progress of the sale of certain goods on an online marketplace, for example, the seller could dynamically adjust the type, quantity, and/or prices of goods that are being sold.

The present disclosure describes systems, methods, and techniques in which the connection provider 120 provides one or more services to one or more sellers. The connection provider 120 can provide a report to show key metrics to the seller regarding the sales of the seller goods. The report may be a dashboard that can include, among other metrics, item sales information, top-line highlights, bottom-line highlights, and an executive summary. The dashboards can provide feedback to the seller for various reporting periods (e.g., daily, weekly, monthly, quarterly, annually, year-to-date, and/or user-definable date ranges). Information in the dashboards can be provided automatically and may be standardized to a defined format. The type and amount of information provided may be scalable and based on the quantity of goods sold. The dashboard can provide value and a competitive advantage to sellers in strategically positioning their items in an online marketplace.

The seller can supply information about the items being sold to the connection provider—for example, in the form of an electronic document such as a Product Data File (PDF)—and the connection provider can use this information to arrange for the items to be sold on an online marketplace. The connection provider can supply various types of service to the seller. For example, the connection provider can provide value to the seller greater than what would be normally provided via one or more key metrics about the goods being sold. With one or more key metrics, the seller can be in a better position set one or more strategic goals in the sale of their goods. Some of these strategic goals can allow the seller to improve bottom-line and top-line sales metrics. Other strategic goals may involve adjusting an amount and/or type of good that is sold, responding more quickly in a dynamic sales environment, and determining what benefits they can receive from their online sales channel and/or connection provider.

FIG. 2 is a block diagram of a connection architecture in which a connection provider 244 facilitates the access (e.g., connection) of one or more merchants/sellers 212 to one or more online sales channels 216. The connection provider 244 may receive information from a seller 212, in which the information describes one or more items for sale by the seller. The connection provider 244 may facilitate a sale of the item through one or more online sales channels 214. The connection provider 244 may also facilitate fulfillment of the item for sale with a fulfillment center 232. In a typical implementation, the connection provider 244 can provide services and a software infrastructure (e.g., data communications, order management integration, checkout processes, and user interface capabilities) that enables a merchant/seller 212 to provide information describing one or more items to be sold on an online sale channel. The connection provider 244 may then list the items for sale on one or more online sales channels 216 and, depending on the level of service selected by the seller/merchant 212, can fulfill an order (that is, a consummated sale) of an item using a fulfillment center 232 that is appropriate to the nature of the item sold.

The fulfillment centers 212 may have one or more parameters tailored to characteristics, features and/or processing requirements of the sold item. For example, FC1 may correspond to a "new-in-box" fulfillment center that handles fulfillment of sales of items that are sold as new in boxes as received from the item's manufacturer (e.g., TV sets or laptop computers). FC2 may, for example, correspond to a "refurbishment" fulfillment center that receives used, and potentially damaged, items from a seller and then refurbishes them as needed to place them in condition for sale. Such refurbishment may include activities such as cleaning, reformatting, replacing consumable components, re-labeling, certifying and/or virtually anything else needed to place the items in the desired condition for sale. Computer equipment that has been used internally by a seller's employees, and which is being upgraded or replaced, is an example of the types of items that may be fulfilled through a refurbishment fulfillment center. Another example may include a product that has been returned to a manufacturer or retailer.

Further, FC3 may correspond to a "fragmented inventory" fulfillment center. In this type of fulfillment center, a seller typically has a collection of various odds and ends that it wants to sell through an online sales channel. In many case, these odds and ends may not be part of regular inventory and be in various states of disorganization or disrepair. For example, following a large sale or after taking inventory, a department store may discover that it has many items that are close-outs, last of kind, odd sizes, mis-marked on unlabeled, and so on. Because in many cases such odds and ends are not adequately recorded in the seller's inventory database, the seller may be unable to prepare or send a PDF 250 that describes these items at a SKU (Stock Keeping Unit) level—a unique identifier, usually alphanumeric, of a particular item that allows it to be tracked for inventory purposes.

To dispose of these odds and ends the department store can load up the items and send them directly to a fragmented inventory fulfillment center, which will then process the items, for example, by organizing, labeling, pricing, inventorying, assigning SKUs, re-conditioning, grouping, photographing (e.g., for display on the online sales channel website) and so on. An end result of such processing by a fragmented inventory fulfillment center typically would include the creation of an electronic data file, such as the PDF 250 and product photos describing each of the fragmented inventory items at a SKU level, which could then be transmitted to the connector provider's computer systems by the fulfillment center. Note that such an implementation of a fragmented inventory fulfillment center provides an additional level of service to the seller—namely, the creation and maintenance of the PDF 250 for the items to be sold by the connection provider.

Among the other functions described here, the fulfillment center 232 also may serve as a warehouse, shipping, storage, or distribution center for the items sold. The connection provider 244 may, at least at some level, control the fulfillment centers 232, and at least one of the fulfillment centers 232 may be operated according to one or more parameters tailored to the sold items. Because a fulfillment center may provide one or more services, and/or have one or more parameters relating to fulfilling orders for items sold for multiple sellers, there may be at least one fulfillment center to fulfill sales of items owned by multiple, different sellers but which has at least some features, characteristics and/or processing requirements in common. Hence, multiple sellers may share a common fulfillment center due to a commonality related to a particular fulfillment center's parameters. Similarly, sales of a single merchant's items may be fulfilled through multiple different fulfillment centers, each fulfillment center selected depending on geography, features, characteristics, or processing requirements of the various items being sold by the seller through the online sales channel.

The connection provider 244 may be an intermediary that facilitates access to one or more online sales channels 216 and which neither takes title and/or possession of the items being sold. The merchants 212 may include small businesses, large companies, organizations, individuals, or other entities selling an item. The fulfillment centers 232, which can be controlled but not necessarily owned by the intermediary, can fulfill orders from multiple merchants 212 having the same type or nature of items. The fulfillment centers 232 may be owned, operated or dedicated to one or more of the merchants 208. The fulfillment centers 232 may also be owned and operated independently of the merchants 212, the online sales channels 216, and/or the intermediary 244. The online sales channels 216 may include multiple web sites or marketplaces listing the items being sold. Alternatively, one or more of the online sales channels may be operated or controlled by the connection provider 244.

The merchants 212 may offer various items for sale with different properties, characteristics or fulfillment requirements. The connection provider 244 can identify and coordinate the fulfillment of an item for sale with a fulfillment center 212 that is tailored to a parameter to that item for sale. As described above, a fulfillment center may be tailored according to a set of one or more activities that are required for preparation of items prior to delivery to the buyer. Moreover, the connection provider 244 can identify a fulfillment center 222 that has particular environmental characteristics tailored to the items being sold, such as refrigeration for chocolate or flowers sold from merchant 202, in which a key parameter for the item sold is the temperature at which the inventory is stored. In another example, a key parameter of identifying the fulfillment center 224 can be geography—that is, the connection provider 244 can identify a fulfillment center 224 that, e.g., is geographically located near a certain agricultural facility for certain produce for a merchant 204. In general, one or more parameters may be associated with an item being sold and one or more parameters may be associated with a fulfillment center 226. An identified fulfillment center 226 may be tailored for one or a combination of parameters or characteristics for an item being sold.

As discussed in connection with FIG. 2, the merchant 206 can send information to and receive information from the connection provider 244. The sent information may include details and descriptions on the items for sales and any relevant parameters related to those items. After the merchant sends the information to the connection provider, the merchant may elect to have the connection provider coordinate all or part of the fulfillment obligations of the order. The connection provider 244 may process the information and select one or more fulfillment centers 232 based on one or more parameters from the item being sold. The information for the fulfillment centers, including parameter information, may reside on a database in the connection provider's facilities.

In the implementation shown in FIG. 2, the information sent from the merchant 212 to the connection provider 244 may be a PDF 250 delineating the items at the SKU level. The PDF 250 may be in a tabular format, and may include data fields with detailed item information. Alternatively, the information sent from a merchant 212 to the connection provider 244 may include metadata or an eXtensible Markup Language (XML) object with one or more parameters of the items being sold. Instead of, or in addition to an XML object, the information sent from the merchant may include two or more objects, with one object containing information for the items being sold, and another object with information regarding one or more parameters. The term "object" may refer to information sources such as documents, reports, presentations, files and directories. In another implementation, the connection provider 244 may also provide a dedicated portal interface to merchants, in which a merchant can transmit information through the portal to the connection provider in a secure, pre-determined format.

The PDF 250 may also have information that enables the content provider 244 to offer additional value to the seller. For instance, the PDF 250 may have one or more enhanced data fields 255 that can enable a seller to track the progress of goods sold. "Enhanced" data can refer to data that provides information other than minimally-required baseline data (e.g., the name, type, or quantity of good being sold).

The connection provider 244 can use the data in the enhanced data fields 255 to generate one or more reports. The reports may be sent to the seller to allow the seller to assess the progress of one or more items for sale. The connection provider may automatically generate the reports and permit them to be accessed at the convenience of the seller. The reports can be emailed to the seller, and/or the reports can be assessed in a graphical user interface (e.g., a dashboard and/or summary). The connection provider 244 can provide a level of security (e.g., passwords) to the reports to allow on a particular seller to access their reports.

The connection provider may also use data provided in the enhanced data fields 255 to customize one or more items being sold on one or more sales channels 216. For example, the PDF 250 may include information that specifics which sales channels should be utilized, and how a merchant's items should be displayed and sold on those sales channels.

The enhanced data fields 255 may also allow the seller to group items for sale, cross-merchandise items for sale, and generate more sales activity from buyers. For example, the seller may complete data fields to sell a shirt on one or more online sales channels. The seller may specify in the PDF 250 in enhanced data fields that matching pants and accessories should be displayed for sale along with the shirt. In another implementation, the enhanced data fields may specify for the online sales channel to display positive customer feedback for the seller (e.g., "The item was received in a week, and it was in excellent condition").

The PDF 250 may also include data to identify a particular fulfillment center for a merchant 212. The identification of an appropriate fulfillment center 232 typically is performed manually, for example, by a human operator associated with the seller or the connection provider. However, identification of a fulfillment center could be performed, at least in part, by an automated process, for example, based on information received from the seller. The connection provider can determine the parameters for the items being sold and can manually identify an appropriate fulfillment center.

In another implementation, the merchant sends parameter information to the connection provider only once during initial setup of the merchant's account or relationship. If a merchant intends to sell only one type of item then the merchant does not need to resend parameter information along with information for their items for sale.

The connection provider (e.g., Accenture) 244 may provide a broad range of sales channel facilitation services, such as billing services, collection services, advertisements, and customer service. The customer service capabilities may include a tool to interface with a buyer, in which the customer service tool may present contact information and policies for the connection provider and online sales channel.

Other sales channel facilitation services may include inventory management, transportation management, order management, store design, merchandising, and listing tools. The listing tools can include providing descriptions, categories, keywords, titles, and scheduling for the items being sold. The listing tools can include pictures and descriptions of the items being sold. The connection provider can provide information about the seller, which can include a presentation of ratings of the seller from other previous buyers to provide post-transaction feedback. Potential buyers can examine the seller's feedback profile before bidding to rate the seller's items and trustworthiness.

The connection provider 244 can monitor a progress of the selling performance of the items. The connection provider 244 also can provide online auction capabilities and the ability to monitor auctions as they progress. The connection provider can help the merchant to formulate auction strategies, selling strategies, and pricing strategies based upon the merchant and/or the items being sold. For example, the connection provider 244 can suggest an auction duration period (e.g., 7 days), pricing (e.g., $10), and start and end times (e.g., 1 pm EST from one Friday to the following Friday) for the auction. The connection provider 244 also can provide various types of auctions, such as Dutch, Chinese, Buy-it-Now "BIN", Large Lot, and Fixed Price.

After an item has been purchased, the connection provider 244 can inform a merchant 210 that a particular item has been purchased on a particular online sales channel 214 to be fulfilled by one or more fulfillment centers 232. The connection provider 244 can also provide data and statistics to the merchant 210 on the buyer and the sale of the item. The connection provider 244 may have a financial tool to report transactions to the merchant 210. The connection provider 244 may inform the merchant 210 (e.g., with an electronic mailing) of purchases or the number of bids on their items. The email to the merchant 210 may be automatically generated by a program and sent from the connection provider 244.

FIG. 3 shows an exemplary block diagram of the PDF 300. The PDF 300 may contain standard data, such as SKU data 310 and seller information 320. The PDF 300 may contain other data fields for enhanced data. For example, the PDF may include anchor prices 300—reference prices for SKUs that are supplied by the merchant. The anchor prices may have an associated anchor price flag that is stored in the seller's database. The anchor price flag can provide insight to the reference price. For example, the anchor price flag can signify if the anchor price represents the price of a Next Best Channel Alternative item (NBA), a Cost of Goods Sold (COGS), a Manufacturer's Suggested Retail Price (MSRP), or a jobber price (e.g., a small-scale wholesale value).

The PDF 300 may also include information for an Average Sales Price (ASP) per SKU (block 340). Other information related to the ASP can be the seller's goal for the ASP as a percentage of a target price (block 350) and/or an anchor price goal (block 360). The ASP as a percentage of the target price (block 350) can be determined by an auction management services (AMS) of the connection provider. The AMS is a service that can process the PDF and is described further below. The ASP as a percentage of the anchor price goal (block 360) can be set by the seller and stored in the PDF. Goals may be set for an auction conversion rate (e.g., a percentage of listings divided by a number of units that are converted into sales). Other data set by the AMS can include the targets set for the units sold per fixed price listing (block 380).

The PDF may include other features, such as descriptions and attributes (e.g., size 12, low-cut, sport socks, item number 12LCSS), groups of attributes in the PDF (e.g., sport socks, dress socks), and shipping and handling information. Other attributes can indicate of the goods have been previously used (e.g., refurbished, used and in good condition, like new condition), and may have pictures and images of the goods being sold. In addition to item information, categories and listing information may be included in the PDF, as well as geographic information on the seller.

FIG. 4 is an exemplary flow diagram for a PDF. The connection provider can take the seller's item data and format it in a way that is compatible with the online sales channel—so that the seller's items can be listed on the online sales channel in a seller-preferred format and/or an online sales channel-preferred format. The connection provider may perform one or more operations to move a seller's item and/or auction information to the online sales channel. For example, the connection provider may receive the PDF from the seller and validate the information in the PDF. The validation may include checking the PDF for errors, missing data, and/or ensuring that enough information is provided to enable an item listing and/or an auctioning.

The collection and validation may be performed by a first connection provider tool, referred to as a "converter tool." The connection provider may then use the converter tool to convert the information collected in the PDF into a text format (e.g., a format that is compatible with the online sales channel). The connection provider may use an upload tool that uploads the text file into a merchant tool database (e.g., a database that feeds eBay's listing format). The upload tool may be a File Transfer Protocol (FTP) tool to upload the text file (e.g., a Product Upload Tool—PUT). The connection provider may have a fourth tool for creating item listings and auction profiles. The item listing and auction profiles can detail the quantity, pricing, and scheduling strategy developed by an auction strategist (associated with the connection provider) for the use of the merchant. The fourth tool can also facilitate the scheduling of item listings and auctions for one or more online sales channels.

The PDF may also have built-in validation functionality. For example, the PDF may be a file (e.g., an Excel file) that has associated macros or logic to constrain the PDF's data input fields to ensure that the input data conforms to the specifications of the connection provider.

FIG. 4 shows the connection provider tools in conjunction with a number of roles involved in the PDF upload and conversion process. A merchant 440 can complete the PDF with its item and target sales information. The merchant 440 may also validate some of the data in the PDF. The merchant 440 may also specify a web template or Hypertext Markup Language (HTML) template that is to be used by the online sales channel when displaying items. After the merchant enters their data, the merchant 440 can send (e.g., email) the PDF (including images) to account management services (AMS) in the connection provider.

The AMS may have one or more persons in one or more roles, such as an account manager, an auction strategist, and an auction administrator. The account manger can determine the tier, type, and service offering of the seller. The connection provider may have multiple tiers based on a level of expected volume of sales from the seller (e.g., three tiers, with a third tier PDF having the lowest expected volume). The higher the tier, the more responsive the connection provider may be in providing services (e.g., periodic reporting) to the seller. For example, the second tier may represent a medium sales volume level seller, based on an average monthly sales value. Also, the connection provider can offer different types of services. For example, the connection provider may offer four levels of service, with service level one representing the most basic service (e.g., providing basic listing service), and service level four representing a total turnkey solution for the seller (e.g., levels one to three and the services of warehouse management, inventory reconciliation, item packaging and shipping).

The PDF may also be classified into various types depending on the seller (e.g., a type 1 client can be a self-sufficient client that provides most all data in the PDF, a type 2 client may want some service for PDF data entry, and a type 3 client may require the connection provider to provide extended service for PDF data entry and auction information). Some sellers may have the ability to complete a PDF and other sellers do not. A type 1 PDF may have little or no errors, whereas a type 2 PDF may be mostly completed, but with some minor errors (e.g., missing SKU). The connection provider can help the seller to complete the type 2 PDF. For a type 3 PDF, the connection provider can complete the PDF data entry, in which few, if any, PDFs are fully completed by the seller. In general, the connection provider may offer any combination of tiers, types, and services to the seller, and may perform one or more operations on the PDF accordingly.

The AMS may also have an auction strategist that receives the PDF from the account manager, reviews the PDF, and makes quality checks before sending the PDF to an auction administrator. The auction administrator can review the PDF and perform any editing of the information. The auction administrator can also perform a quality check, load the PDF into the text conversion tool 430, and use the product upload tool 470 to upload the text file 460 to the merchant tool 480. The merchant tool 480 may store listings until they are ready to be presented on the online sales channel.

The connection provider may also have one or more persons 410 (e.g., a graphic designer) to create an HTML template based on the input received from the account manager and the seller. The HTML template 420 may be shown on the one or more online sales channels.

The HTML template 420 and the PDF may be sent to a web-based application 430 that can merge item attributes with the HTML template to automatically create item-specific descriptions. The application 430 may have a web-based interface 433 and a database 436. The application 430 may include the PDF data to text conversion tool and may allow a preview of item descriptions and images.

The tools in FIG. 4 can allow the connection provider to reduce the amount of time required in manually retrieving and converting data for reports. The tools can include a web-based data warehouse analytical processing tool—e.g., an Online Analytical Processing ("OLAP") tool—to allow personnel from the connection provider (e.g., business analysts, manages, executives) to gain insight into sales and auction performance through interactive access to organized views of sales and auction data. Data analysis from several sources may be streamlined, simplified, grouped and/or organized as desired. The tools may also reduce the amount of effort and time required to create reports, and multiple sources of data may be integrated into the data warehouse.

The data warehouse tool can enable information to be presented in a variety of different ways to show historical results, performance trends, and auction strategy. In one aspect, the OLAP capability can present information in a way to help the user to view historical results to enable the user to identify performance trends and determine the effectiveness of the auction strategy. The OLAP capability may have views, reports, and web presentations that are related to and/or formatted by the connection provider. The tool may help to transform raw data to reflect critical business decisions based on key metrics, such as GMS, ASP, conversion rates, recovery rates, and the like. The information may be presented in a web-based format and may be updated regularly.

The data warehouse tool can provide an option for the user to add additional areas of data and to organize those areas into logical groups. For example, measurements (e.g., GMS, NMS, quantity) for an auction's performance can be grouped by country, merchant, and the date sold. The data may be presented in a tabular format or in a chart (e.g., bar, pie, line, or column charts). The tool can allow dynamic addition of new areas, such as "auction type," and the tool may allow the data to be extracted into another file (e.g., an Excel spreadsheet). The tool also may allow the user to search throughout the logical groups and aggregated data for more detailed information.

FIGS. 5A and 5B are exemplary diagrams for a merchant dashboard. Dashboards can serve as an effective reporting tool to address questions and issues for merchants. The dashboards can provide key metrics, insights, and strategic recommendations on sales activities. The dashboards can also show standard sales metrics (e.g., ASP, GMS). The scope of the reporting can be categorized and presented in various formats (e.g., by SKU, by sales, by item category). The reporting can show interrelationships of sales activities and cause-and-effect patterns (e.g., decrease a number of units for sale for an item to increase the profit margin for that category of items).

The reporting tool can help the connection provider and the merchant to set one or more goals in regards to sales activities, and can provide an integrated view from account planning to customer satisfaction. The merchant can assess the performance of various inventories of various types and assortment of items. The data, analysis, and insights can be provided by the connection provider, and the reporting tool can have self-servicing functionality to allow the merchant to access key information at their convenience. The reports can be delivered in a number of methods (e.g., email, web page, portal, downloads), and can be reported in various frequencies (e.g., monthly, weekly, annually, and user-defined ranges).

FIG. 5A shows a weekly dashboard for a merchant. The dashboard can be customized for the merchant 523 and include a number of panels with various information. The dashboard can include an executive summary 528 with qualitative subjective information that provides value to the quantitative information in the other panels in the dashboard. The information may be benchmarked against the merchant's forecasts, performance targets, and competitive benchmarks. The merchant may be able to ascertain if the performance and sales are on target, and what items and strategies are working well. The merchant can then devise a plan for future sales growth and momentum. Based on the recommendations in the executive summary 528, for instance, the merchant may prefer to lower sales volume for a particular item, or lower a starting price for a SKU.

The dashboard can include top line highlights 533 and bottom line highlights 543. The top line highlights 533 can show how well the merchant's sales perform when measured against forecasts. For instance, the top line highlights 533 may show the NMS in comparison to forecasts. The bottom-line highlights 543 can show bottom line performance (e.g., NMS minus the sales channel fees, including the connection provider fees, PayPal's fees, etc.) and reveal insight to hidden and/or undiscovered costs.

The dashboard may also show item highlights such as slow moving items 546 and best selling items 548. The dashboard may also present a NMS for a specified time range and show a comparison 513 of the target NMS and the actual NMS.

Other dashboards (not shown) may also be presented to allow the merchant to assess the performance of one or more sales, inventory, pricing, and marketing parameters relative to a specified target. For example, a dashboard can present a summary of a merchant's inventory, in which an inventory value may be presented that shows a forecast of inventories and potential GMS. The dashboards permit the seller to track the progress of the sale of certain goods on an online auction so that the seller can dynamically adjust the type, quantity, and/or prices of goods that are being sold.

FIG. 5B shows an exemplary sales dashboard. The dashboard can include a chart 520 of weekly sales activity. The chart 520 can include a legend 525 and a descriptive index 527 for the legend. The dashboard can show "hot" or best-selling items 535 and key statistics (e.g., GMS and NMS for various time periods). The dashboard may show other noteworthy issues, alerts, and news 545 to provide value to the merchant. The news 545 can show customer feedback 547 from the items sold, and one or more recommendations 549 for improving the performance and velocity of sales and inventory, as well as the growth of profits. In the news section 545, for example, the connection provider may recommend adjustments to certain levels of inventory to better adjust to seasonal promotions.

FIG. 6A shows some of the attributes of a PDF file. The attributes in FIG. 6A are shown in a table 605 that is provided by the connection provider to the seller. The seller may complete information in various fields of the table and return the table 605 to the connection provider. In one instance, the amount of the information completed by a seller depends on the client type of the seller (e.g., type 1 client, type 2 client, or type 3 client). In FIG. 6A, attributes can be entered in which the seller can complete one or more attribute fields 600, 601 describing the item being sold. For example, the table 605 can describe a pictorial description 650 of the item being sold in various attribute fields 600, 601. These attributes provide a purchaser with additional item information and provide the seller with the advantages of offering detailed and specialized item information. Other competing items on the online sales channels from other seller may not provide the advantages of detailed and specialized item information. In one case, when a seller is selling a large number of different and related items (e.g., a number of a type of jackets of different sizes and colors) through the connection provider, the additional attribute information provided can allow the buyer to quickly and easily browse (e.g., navigate) and sort through the various related items (e.g., a rain jacket of a blue color and a large size).

FIG. 6B shows a PDF table with a variety of PDF data fields. The PDF table can include columns 660 showing the various fields (e.g., MSRP 667, COGS 670), the requirements 680 for data entries (e.g., numeric, alphanumeric, or symbolic data entries), various service level offerings (e.g., service levels 1 to 4), and descriptions of row entries 686. The PDF table may also provide a column showing examples 688 of proper data entries for each row. The PDF table can include a "display" field column 684 to indicate if the data entry in the row should be displayed when the item being sold is being displayed, or if the row data entry is an optional feature to display when the item is being sold.

In general, the PDF table may have one or more of the following fields of information: item information (e.g., item name, item SKU); categories and listing information (e.g., merchant category, sales channel category); quantities and pricing information (e.g., MSRP, COGS); geographic information (e.g., city, state, region); images (e.g., photographs, drawings); image listing information (e.g., item title, listing template); shipping and handling information (e.g., shipping costs, delivery instructions, item weight and size, item return information); and attributes (e.g., item display attributes, online marketplace item attributes). The PDF may also include product reviews from previous customers or from product testing experts.

The PDF table in FIG. 6B may include the features shown in FIG. 6A to provide user-defined features (pictures, diagrams and corresponding descriptions) that can provide additional benefits for the buyer to enhance their shopping experience (e.g., detailed item information). The PDF may have a set of "standard data fields" that are recommended fields to help the merchant to provide a description of the item for sale on the online sales channels. The standard data fields may also include fields for promotional messages and campaigns, as well as data fields for the best recommended practices for selling the goods (e.g., recommended practices for shipping and handling of the item).

The PDF may also use metadata to permit the connection provider to report back to merchants on specific attributes of the items for sale. The metadata can also be used in forming an auction profile to determine the attributes that promote the optimum sales. For example, a merchant may sell deferent types of video recorders an online marketplace. The connection provider can collect information regarding the attributes of the video recorders, and report back to the merchant of the attributes that sell the best (e.g., digital video recorders of a certain form factor from a particular manufacturer). The reporting may be specific as reporting back a SKU of the best-selling item, or can be general to report a generic description of the item (e.g., digital video recorders sell better than analog or tape-based video recorders).

The PDF table may be implemented in a spreadsheet program, such as the Excel spreadsheet software by Microsoft Corporation of Redmond, Wash. The sellers may return the completed or partially completed PDF table to the connection provider. The spreadsheet may be in a standardized format to permit the connection provider to quickly assess and validate item information. The standardized format may be a PDF table with pre-defined rows and columns with some data entry fields completed with default values, and other fields that that the seller may be required to complete.

FIG. 7 shows an exemplary architectural block diagram of a connection system. The seller or merchant 736 may employ one or more computer system users 762 to enter information for one or more items for sale in a graphical user interface 761. The merchant's computer system may have a repository or database 725 with files, objects, and documents 727, 729 with information describing the merchant's items, businesses, financial information, human resource information, etc. Typically, the information describing the merchant's items for sale is recorded and maintained at the level of the SKU. The merchant's information may be accessed in a network of computers 728. The merchant's system may also be on a physically distributed system, in which information may reside on one or more computers 728 and databases 725, and may be accessed by one or more users 762. The merchant 736 may transmit a PDF with item and sales information to a connection provider 703, which can use the information to list the items for sale on one or more online marketplaces 783. In general, the information transmitted to and received from the connection provider 703 may include one or more of the following: business-specific information, such as sales and customer information; data within objects, spreadsheets, and text files; and business-related applications and logic.

The information generated from the merchant 736 may be generated by a program or an automated process that may not require a user 762 or a corresponding graphical user interface 761. For instance, the merchant 736 may have a program to automatically generate results for certain data fields of the PDF table (e.g., quantities for sale, starting auction prices, merchant preferences for a particular online sales channel). In some cases, the automatically-generated data fields may relate more to the seller rather than to the item being sold (e.g., shipping information and policies, item return information, merchant contact information). The automation and standardization features of the PDF can simplify the merchant's task of submitting detailed item information for a number of items.

On the connection provider's side, the connection provider can use the standardized features of the PDF to automate validation and processing of data entries. The amount of data entries provided in the PDF may be scalable and based on the number of items sold and/or the listing details of the items. Due to the nature of the PDF's scalability, standardization, and automation in processing, the connection provider can provide detailed and organized item information from one or more merchants to one or more online sales channels expeditiously.

At a basic level, the connection provider 703 offers connection services between one or more merchants 736 and one or more online marketplaces 783. The connection provider may have a computer system architecture that includes objects, documents 704 and information residing on one or more repositories or databases 701. The information may be networked among multiple computers 702. The connection provider 703 may or may not share hardware resources with the online marketplaces 783.

The connection provider 703 may also receive information from multiple sellers (not shown) regarding the items they are selling. The connection provider 703 can facilitate a sale of the items through one or more online sales channels 783. The items may sell at different times and in different quantities and may sell to different customers on several online sales channels. The connection provider can then facilitate the fulfillment of sold items through one or more fulfillment centers (232 shown in FIG. 2).

As used herein, the terms "electronic document" and "document" mean a set of electronic data, including both electronic data stored in a file and electronic data received over a network. An electronic document does not necessarily, but may, correspond to a file. A document may be stored in a portion of a file that holds other documents, in a single file dedicated to the document in question, or in a set of coordinated files. The term "object" may refer to information sources such as documents, reports, presentations, files and directories.

The disclosed software, techniques, and systems described herein may use software and structures available from the connection provider. Instead of or in addition to software and systems supplied by the connection provider, the disclosed software and systems may coexist or operate with software and systems provided by third parties.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

The software (also known as programs, software tools or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface, portal, or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), a wireless local area network ("WLAN"), a personal area network ("PAN"), a mobile communication network using a multiple access technology (e.g., a cellular phone network with Code Division Multiple Access, "CDMA"), and the Internet.

The computing system can include clients (FIG. 7) and servers. A client and server are generally remote from each other and typically interact through a communication network. The relationship of client and server arises by virtue of computer programs running on the respective computers and having a client-server relationship to each other.

Although only a few implementations have been described in detail above, other modifications are possible. Nevertheless, it will be understood that various modifications may be made without departing from the spirit and scope of the claims below. For example, the parameters listed in FIG. 3 may include other parameters for specific merchants and/or items. The user interfaces described above may be referred to as panels, palettes, pages, views, or portions of other interfaces. The logic flow depicted in FIG. 4 does not require the particular order shown, or sequential order, to achieve desirable results. Other implementations may be described so that the connection provider can provide enhanced value to sellers (e.g., via providing real-time reporting information on the state of one or more sales channels). The connection provider may send the PDF along with other information (e.g., rules and regulations for selling items online, frequently asked questions—FAQs, user guides and step-by-step instructions for completing and returning the PDF). Accordingly, other implementations are within the scope of the following claims.

What is claimed is:

1. A computer-implemented method comprising:

receiving, at a third party facilitator of a transaction, a file including item description data which describes items, and enhanced data which specifies an approach for conducting the transaction and which supplies value benchmarks for the items;

monitoring performance of the transaction as the transaction is being facilitated by the third party facilitator over one or more online channels;

using one or more processors to calculate metrics for the items based on comparing the monitored performance of the transaction to the supplied value benchmarks;

using the calculated metrics and historical transaction data to generate, by the third party facilitator, a recommendation for improving the performance of the transaction, the recommendation suggesting that a quantity and type of items being sold should be adjusted to different values than were specified by the owner of the items, for any remaining portion of the transaction;

presenting a dashboard interface to the owner of the items, the dashboard interface providing the calculated metrics and the recommendation of the third party facilitator for improving the performance of the transaction;

permitting the owner to adjust the approach for conducting the remaining portion of the transaction, using the dashboard interface;

selecting a fulfillment center that is appropriate to the items, based on the description data or the enhanced data, the fulfillment centers comprise warehouse, shipping, storage, or distribution centers for the items being transacted, and the fulfillment center is selected from the group consisting of a new-in-box fulfillment center, a refurbishment fulfillment center, and a fragmented inventory fulfillment center; and facilitating the remaining portion of the transaction according to the adjusted approach.

2. The method of claim 1, wherein permitting the owner to adjust the approach further comprises permitting the owner to adjust a quantity and type of the items being transacted, responsive to presenting the recommendation of the third party facilitator that the quantity and type of items being sold should be adjusted to different values than were specified by the owner of the items.

3. The method of claim 1, further comprising re-conditioning the items at a fulfillment center, wherein receiving the file further comprises, at the third party facilitator:

receiving an indication from the owner that the items represent fragmented inventory with no associated unique identifier, inventorying the items, assigning unique identifiers to the inventoried items, generating the description data, generating the file, and populating the file with the unique identifiers and the description data.

4. The method of claim 1, wherein the enhanced data which specifies the approach for conducting the transaction specifies which of the one or more online channels to use in conducting the transaction.

5. The method of claim 1, wherein the enhanced data which specifies the approach for conducting the transaction specifies how the items should be displayed and sold on the one or more online channels.

6. The method of claim 1, wherein the enhanced data which specifies the approach for conducting the transaction specifies which of the items should be displayed together for sale at a same time.

7. The method of claim 1, wherein the enhanced data received in the file which specifies the approach for conducting the transaction specifies whether positive customer feedback for the owner should be displayed on the one or more online channels.

8. The method of claim 1, wherein the value benchmarks comprise an anchor price for each of the items, and an anchor price flag indicating whether the anchor price represents a Next Best Channel Alternative (NBA), a Cost Of Goods Sold (COGS), a Manufacturer's Suggested Retail Price (MSRP), or a jobber price.

9. The method of claim 8, wherein:

the value benchmarks further comprise an Average Sales Price (ASP) per Stock Keeping Unit (SKU) associated with each item, and the ASP per SKU is expressed as a percentage of the anchor price.

10. The method of claim 1, wherein presenting the dashboard interface further comprises:

providing qualitative subjective information providing value to quantitative information in other regions of the dashboard interface, and further providing the recommendation, providing the calculated metrics, a best selling item and a slowest moving item of the items, and displaying feedback for transacted items.

11. The method of claim 10, further comprising providing a chart of transaction activity for a given time period.

12. The method of claim 1, wherein the transaction comprises a sales transaction.

13. The method of claim 1 wherein using the calculated metrics and historical transaction data to generate, by the third party facilitator, the recommendation for improving the performance of the transaction, the recommendation suggesting that the quantity and type of items being sold should be adjusted to different values than were specified by the owner of the items, for any remaining portion of the transaction comprises using the calculated metrics and historical transaction data to generate, by the third party facilitator, a recommendation for improving the performance of the transaction, the recommendation suggesting that a quantity of items being sold should be adjusted to a different quantity than was specified by the owner of the items, for any remaining portion of the transaction.

14. The method of claim 1 wherein using the calculated metrics and historical transaction data to generate, by the third party facilitator, the recommendation for improving the performance of the transaction, the recommendation suggesting that the quantity and type of items being sold should be adjusted to different values than were specified by the owner of the items, for any remaining portion of the transaction comprises using the calculated metrics and historical transaction data to generate, by the third party facilitator, a recommendation for improving the performance of the transaction, the recommendation suggesting that a type of items being sold should be adjusted to a different type than was specified by the owner of the items, for any remaining portion of the transaction.

15. A computer readable medium encoded with a computer program comprising instructions that, when executed, operate to cause a computer to perform operations comprising:

receiving, at a third party facilitator of a transaction, a file including item description data which describes items, and enhanced data which specifies an approach for conducting the transaction and which supplies value benchmarks for the items;

monitoring performance of the transaction as the transaction is being facilitated by the third party facilitator over one or more online channels;

using one or more processors to calculate metrics for the items based on comparing the monitored performance of the transaction to the supplied value benchmarks;

using the calculated metrics and historical transaction data to generate, by the third party facilitator, a recommendation for improving the performance of the transaction, the recommendation suggesting that a quantity and type of items being sold should be adjusted to different values than were specified by the owner of the items, for any remaining portion of the transaction;

presenting a dashboard interface to the owner of the items, the dashboard interface providing the calculated metrics and the recommendation of the third party facilitator for improving the performance of the transaction;

permitting the owner to adjust the approach for conducting the remaining portion of the transaction, using the dashboard interface;

selecting a fulfillment center that is appropriate to the items, based on the description data or the enhanced data, the fulfillment centers comprise warehouse, shipping, storage, or distribution centers for the items being transacted, and the fulfillment center is selected from the group consisting of a new-in-box fulfillment center, a refurbishment fulfillment center, and a fragmented inventory fulfillment center; and facilitating the remaining portion of the transaction according to the adjusted approach.

16. The computer readable medium of claim 15, wherein the value benchmarks comprise an anchor price for each of the items, and an anchor price flag indicating whether the anchor price represents a Next Best Channel Alternative (NBA), a Cost Of Goods Sold (COGS), a Manufacturer's Suggested Retail Price (MSRP), or a jobber price.

17. A system comprising:
one or more computers; and
a computer-readable medium coupled to the one or more computers having instructions stored thereon which, when executed by the one or more computers, cause the one or more computers to perform operations comprising:

receiving, at a third party facilitator of a transaction, a file including item description data which describes items, and enhanced data which specifies an approach for conducting the transaction and which supplies value benchmarks for the items;

monitoring performance of the transaction as the transaction is being facilitated by the third party facilitator over one or more online channels;

using one or more processors to calculate metrics for the items based on comparing the monitored performance of the transaction to the supplied value benchmarks;

using the calculated metrics and historical transaction data to generate, by the third party facilitator, a recommendation for improving the performance of the transaction, the recommendation suggesting that a quantity and type of items being sold should be adjusted to different values than were specified by the owner of the items, for any remaining portion of the transaction;

presenting a dashboard interface to the owner of the items, the dashboard interface providing the calculated metrics and the recommendation of the third party facilitator for improving the performance of the transaction;

permitting the owner to adjust the approach for conducting the remaining portion of the transaction, using the dashboard interface;

selecting a fulfillment center that is appropriate to the items, based on the description data or the enhanced data, the fulfillment centers comprise warehouse, shipping, storage, or distribution centers for the items being transacted, and the fulfillment center is selected from the group consisting of a new-in-box fulfillment center, a refurbishment fulfillment center, and a fragmented inventory fulfillment center; and facilitating the remaining portion of the transaction according to the adjusted approach.

18. The system of claim 17, wherein permitting the owner to adjust the approach further comprises permitting the owner to adjust a quantity and type of the items being transacted, responsive to presenting the recommendation of the third party facilitator that the quantity and type of items being sold should be adjusted to different values than were specified by the owner of the items.

19. The system of claim 17, wherein:
facilitating the transaction further comprises selecting a fulfillment center that is appropriate to the items, based on the description data or the enhanced data,
the fulfillment centers comprise warehouse, shipping, storage, or distribution centers for the items being transacted, and
the fulfillment center is selected from the group consisting of a new-in-box fulfillment center, a refurbishment fulfillment center, and a fragmented inventory fulfillment center.

20. The system of claim 17, wherein the operations further comprise re-conditioning the items at a fulfillment center, wherein receiving the file further comprises, at the third party facilitator:
receiving an indication from the owner that the items represent fragmented inventory with no associated unique identifier,
inventorying the items,
assigning unique identifiers to the inventoried items,
generating the description data,
generating the file, and
populating the file with the unique identifiers and the description data.

21. The system of claim 17, wherein the enhanced data which specifies the approach for conducting the transaction specifies which of the one or more online channels to use in conducting the transaction.

22. The system of claim 17, wherein the enhanced data which specifies the approach for conducting the transaction specifies how the items should be displayed and sold on the one or more online channels.

23. The system of claim 17, wherein:
the value benchmarks further comprise an Average Sales Price (ASP) per Stock Keeping Unit (SKU) associated with each item, and
the ASP per SKU is expressed as a percentage of the anchor price.

* * * * *

UNITED STATES PATENT AND TRADEMARK OFFICE
CERTIFICATE OF CORRECTION

PATENT NO. : 7,739,148 B2  Page 1 of 1
APPLICATION NO. : 10/797906
DATED : June 15, 2010
INVENTOR(S) : Masami Alice Suzuki et al.

It is certified that error appears in the above-identified patent and that said Letters Patent is hereby corrected as shown below:

Column 1, Line 3 below "Title" insert
-- CROSS-REFERENCE TO RELATED APPLICATIONS
This application is a continuation application of, and claims priority to, U.S. Patent Application No. 10/794,769, entitled "PRODUCT DATA FILE FOR ONLINE MARKETPLACE SALES CHANNELS," which was filed on March 5, 2004. --

Signed and Sealed this

Twenty-third Day of November, 2010

David J. Kappos
*Director of the United States Patent and Trademark Office*